(12) United States Patent
Charlat et al.

(10) Patent No.: US 8,367,268 B2
(45) Date of Patent: Feb. 5, 2013

(54) SEALING JOINT AND FUEL CELL PLATE, CELLS OBTAINED AND RESULTING FUEL CELLS COMPRISING A STACK OF SUCH CELLS

(75) Inventors: Pierre Charlat, Lans en Vercors (FR); Thierry Novet, Bernin (FR); Guillaurne Roberge, Bourgoin (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 1056 days.

(21) Appl. No.: 11/574,433

(22) PCT Filed: Jun. 17, 2005

(86) PCT No.: PCT/FR2005/050455
§ 371 (c)(1),
(2), (4) Date: Nov. 17, 2008

(87) PCT Pub. No.: WO2006/030136
PCT Pub. Date: Mar. 23, 2006

(65) Prior Publication Data
US 2009/0214930 A1   Aug. 27, 2009

(30) Foreign Application Priority Data
Sep. 9, 2004 (FR) .................................... 04 52002

(51) Int. Cl.
*H01M 2/08*   (2006.01)
(52) U.S. Cl. ......... 429/507; 429/508; 429/509; 429/511

(58) Field of Classification Search ................. None
See application file for complete search history.

(56) References Cited

U.S. PATENT DOCUMENTS

| 4,978,590 A | 12/1990 | Granata, Jr. et al. |
| 6,939,638 B2 * | 9/2005 | Saito et al. ..................... 429/454 |
| 2001/0019790 A1 * | 9/2001 | Regan et al. .................... 429/35 |
| 2003/0003345 A1 * | 1/2003 | Ohara et al. .................... 429/38 |

FOREIGN PATENT DOCUMENTS

| JP | 11-311492 | * 11/1999 |
| WO | WO 00 68463 | 11/2000 |

OTHER PUBLICATIONS

Machine translation of JP 09-055217, Hiroshi Yanagihara, Feb. 25, 1997.*
International Search Report for PCT/FR2005/050455.
Patent Abstracts of Japan, vol. 1997, No. 06, Jun. 30, 1997, and JP 09 055217, Feb. 25, 1997.

* cited by examiner

*Primary Examiner* — Barbara Gilliam
*Assistant Examiner* — Kwang Han
(74) *Attorney, Agent, or Firm* — Christopher J. Cronin

(57) ABSTRACT

The invention concerns an elastomer seal (3) arranged in a generally rectangular groove of a bipolar plate (1), comprising in at least two opposite corners one first loop (6) urged to be attached on a corner pin (7) of the plate (1) and at least a second loop (8) designed to be urged to be attached, when the two plates are assembled enclosing between them an exchanging membrane, to a corner pin of the other polar plate. The seal further comprises studs (10) received in recesses of the plate and forms projecting lugs (11) for crimping the terminals of electronic components. The invention is applicable to the production of fuel cells.

6 Claims, 2 Drawing Sheets

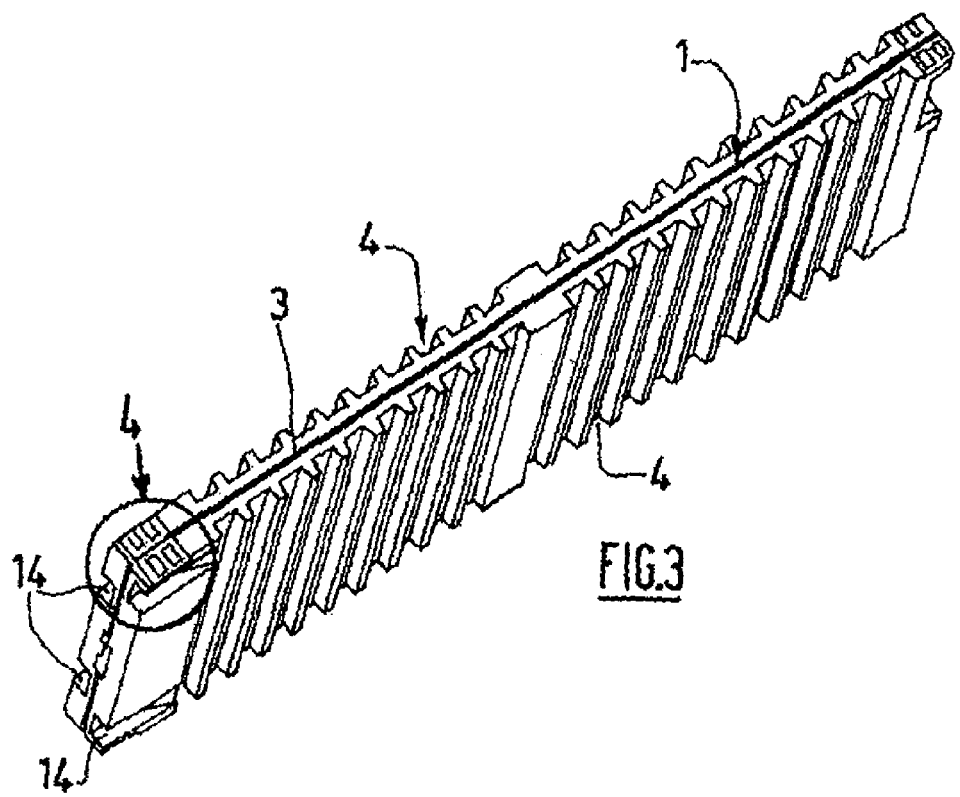
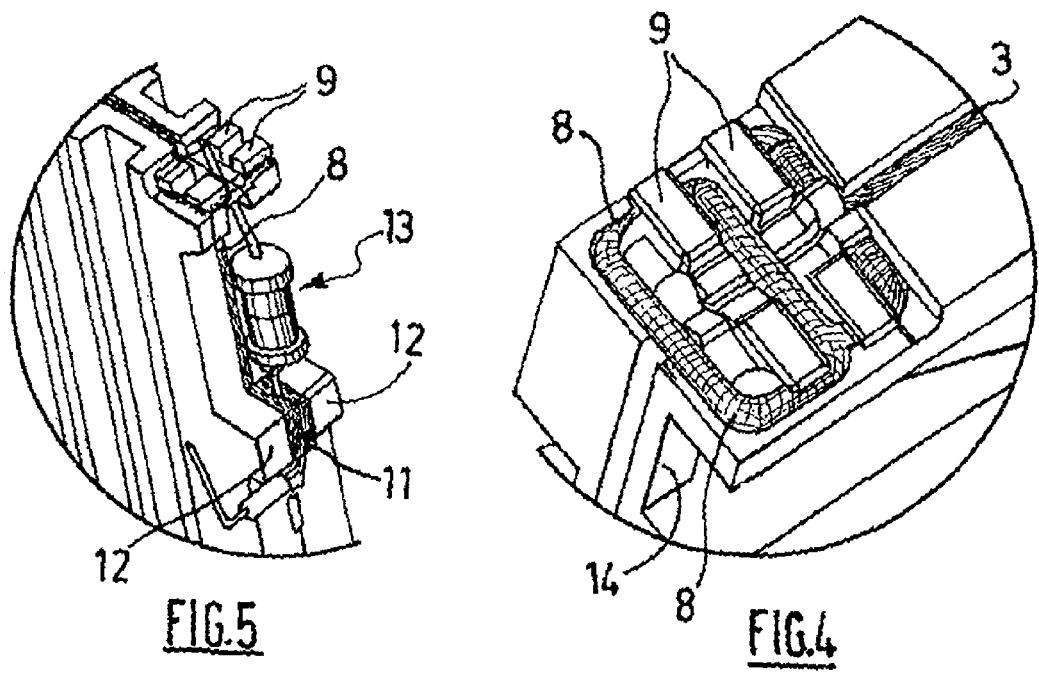

SEALING JOINT AND FUEL CELL PLATE, CELLS OBTAINED AND RESULTING FUEL CELLS COMPRISING A STACK OF SUCH CELLS

BACKGROUND

The present invention relates to fuel cell assemblies of the type comprising an assembly of individual cell elements and in particular to the architectures of gaskets between pole plates, and corresponding pole plates.

The cell elements of a fuel cell assembly consist of an assembly of conducting, monopolar or bipolar, plates, sandwiching a membrane structure, and gaskets interposed peripherally between such plates, sealing being achieved when the gaskets between the plates are pressed.

When mounting each cell element, and during subsequent maintenance operations, it is necessary for each cell element to be correctly positioned in the cell pack, preventing any misalignment between cell elements and any pleats or pinching of the interposed gaskets.

One object of the present invention is to propose a gasket/pole-plate architecture that allows easy catching of the gasket on the plates, while ensuring reliable positioning of the gasket.

Another object of the present invention is to propose such a gasket/plate architecture that allows a cell element to be held in place in a closed position before it is fitted into the fuel cell assembly thanks to the shape of the gaskets and plates.

To do this, according to one feature of the invention, a gasket comprises a main part in the form of a polygonal, typically rectangular, frame and, in at least two diagonally opposed corners of the frame, a projecting part forming at least a first loop for catching on the edge of a plate.

According to another feature of the invention, the projecting part of the gasket includes a second loop for catching on the edge of the other plate of the pair of plates constituting a cell element.

According to one aspect of the invention, a pole plate of a cell element comprises, on at least one face, an array of fluid circulation channels and, on their periphery, a slot of rectangular general configuration, intended to house a gasket, and, in at least two diagonally opposed corners, at least one lug for catching a loop of the gasket.

According to particular features of the invention:
the slot has a trapezoidal cross section; and
the gasket has, on one of its main faces, a longitudinal slot.

Another subject of the present invention is a cell element of a fuel cell assembly, consisting of a pair of adjoined plates, each provided with a gasket, such as the plates and gaskets defined above.

Another subject of the invention is such a cell element assembled by catching the gasket onto the plates.

A final subject of the invention is a fuel cell assembly comprising a stack of such cell elements.

Other features and advantages of the invention will become apparent from the following description of embodiments given by way of illustration but implying no limitation, in conjunction with the appended drawings in which:

FIG. 3 is a perspective view of an assembled cell element according to the invention;

FIG. 4 is an enlarged view of the corner portion, indicated by 4 in FIG. 3;

FIG. 5 is a partial view of a short side of the assembly illustrated in FIG. 3, showing the fitting of measurement components associated with the cell element.

Figure 1:
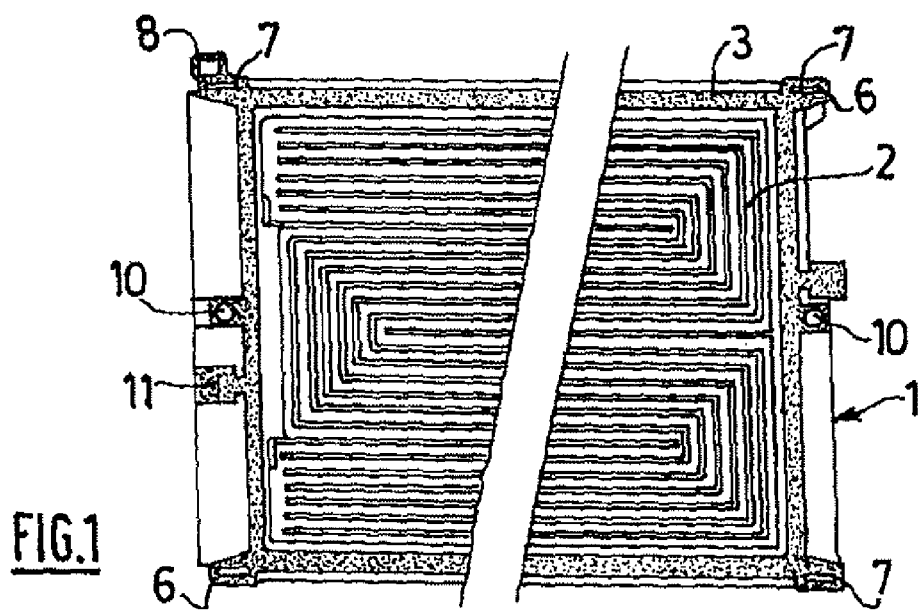
FIG. 1 is a plan view of a pole plate and of a gasket according to the invention before catching.

In the embodiment shown in FIG. 1, there is a pole plate 1, of flat rectangular general configuration, comprising, on one face, an array of fluid distribution channels 2, a peripheral slot for housing a resilient gasket 3, as will be seen later, and, on its other face, parallel fluid circulation channels 4 (cf. FIG. 3).

Figure 2:
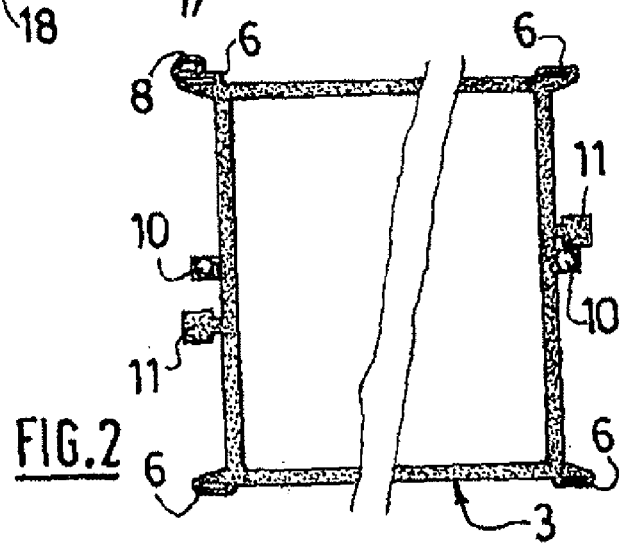
FIG. 2 is a plan view of the gasket of FIG. 1.

As may be seen in FIG. 2, the gasket 3 has a general configuration in the form of a rectangular frame, of rectangular cross section, intended to be housed in a corresponding rectangular slot 5 in the plate (cf. FIG. 6) with, in at least two diagonally opposed corners, advantageously in the four corners, a projecting part forming a loop 6 that catches resiliently, in the assembly configuration, on a corresponding internally projecting lug 7 of the plate 1. The gasket 3 may thus be correctly placed, under slight tension, in the slot 5 of the plate 1.

According to one aspect of the invention, the gasket 3 includes, in at least one of its corners, another loop 8 that extends cantileveredly outwards from the adjacent first loop 6. As may be better seen in FIGS. 4 and 5, this external loop 8 of the gasket of a pole plate is intended to be bent over and resiliently caught around at least one other projecting part 9 of the other plate, this resilient catching thus making it possible for the two plates applied against each other to be held in place in a unitary subassembly as shown in FIG. 3.

According to other aspects of the invention, each gasket 3 includes, on one of the short sides of the rectangle, at least one tab 10 resiliently housed, by gently force-fitting it, in a corresponding recess provided on the periphery of the plate 1, and also at least one tongue 11 projecting externally and associated with a corresponding protuberance 12 on the pole plate 1 in order to form, in the assembled configuration, jaws for clamping a conductor or a terminal of an electronic component 13 associated with the cell element for measuring the voltage of the latter.

As may be seen in FIG. 3, each pole plate 1 has, on one of its short sides, outwardly opening beveled channels 14 for mounting structures for connecting the fluid channels 2 to external fluid circuits, as described in patent application FR 04/51375 of Jun. 30, 2004, in the name of the Applicant.

Figure 6:
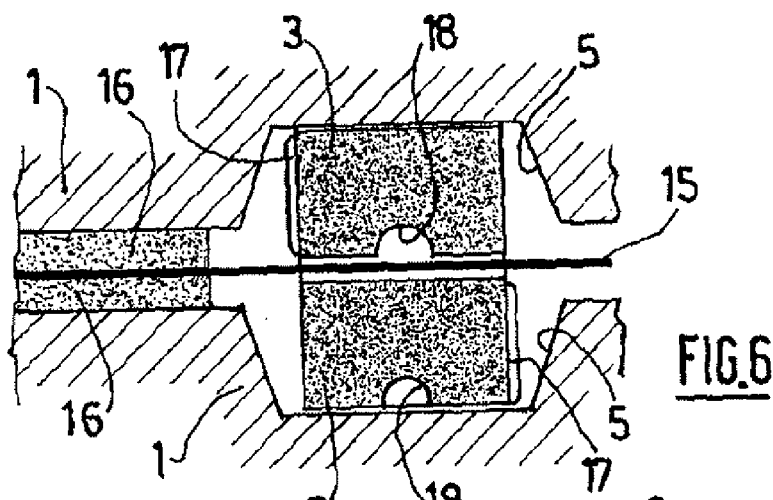
FIG. 6 is a sectional view of one region of the gasket of a cell element according to the invention.

According to one aspect of the invention, the sectional view on a larger scale in FIG. 6 shows the proton exchange membrane 15 clamped with its gas diffusion layer 16 between the pole plates 1, the slot 5 for housing the gasket 3, made of a low-creep resilient material, said slot having a trapezoidal shape, and the gasket 3 having a rectangular cross section, making it possible to achieve a seal with lower compressive forces, while still fitting the gasket into the correct position in the slot. To make it even easier to position the gasket in the slot, the gasket 3 may have, on its lateral faces, parallel vertical ribs or beads 17. In addition, to guarantee correct elastic deformation of the gasket 3 in the slot 5, said gasket includes, on one of its main faces, a longitudinal slot 18. Advantageously, in the assembled configuration, as shown in FIG. 6, the groove 18 of one of the gaskets 3 is positioned against the bottom of the corresponding slot 5, the groove in the other gasket being positioned against the membrane 15.

Advantageously, the pole plates 1 are conventionally produced, these being based on carbon, typically by molding a graphite-based powder. The gaskets 3 are made of elastomers, for example Viton, butyl, EPDM, Hytrel, silicone, etc.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A cell element of a fuel cell assembly, comprising first and second adjoined plates and corresponding first and second gaskets for pole plates of the cell element of the fuel cell assembly, wherein:
   each of said plates comprises, on one face, an array of fluid circulation channels and, on its periphery, a slot of rectangular general configuration housing the corresponding gasket, each of said plates also having, in at least two diagonally opposed corners, at least one lug;
   each of said gaskets haying in at least two diagonally opposed corners, a projecting part forming at least a loop;
   the loop of the gasket housed in the first plate catches resiliently on the lug of the second plate; and
   the loop of the gasket housed in the second plate catches resiliently on the lug of the first plate.

2. The cell element as claimed in claim 1, wherein the projecting part of at least one corner of the gasket provided to said first of the pair of plates includes a second loop that is resiliently housed, by gently force-fitting it, in a corresponding recess provided on the periphery of the second of the pair of plates.

3. The cell element of claim 1, wherein:
   said cell element further comprises at least one electric component for measuring the voltage of the cell element, the electronic component having a terminal or conductor; and
   each of said gaskets has least one tongue projecting externally from a side thereof, the tongue or tongues of one of the gaskets being associated with the tongue or tongues of another of the gaskets to form jaws that clamp the conductor or terminal of the electronic component.

4. A fuel cell assembly, comprising a stack of cell elements of claim 1.

5. The cell element of claim 1, wherein the slot has a trapezoidal cross section.

6. The cell element of claim 1, wherein said plates are made of molded graphite.

* * * * *